(12) United States Patent
Seibald et al.

(10) Patent No.: US 12,503,647 B2
(45) Date of Patent: Dec. 23, 2025

(54) LUMINOPHORE, METHOD FOR PRODUCING A LUMINOPHORE AND RADIATION-EMITTING COMPONENT

(71) Applicant: ams-OSRAM International GmbH, Regensburg (DE)

(72) Inventors: Markus Seibald, Kaufering (DE); Dominik Baumann, Munich (DE); Christiane Stoll, Schwabmuenchen (DE); Hubert Huppertz, Innsbruck (AT); Klaus Wurst, Zirl (AT)

(73) Assignee: ams-OSRAM International GmbH, Regensburg (DE)

( * ) Notice: Subject to any disclaimer, the term of this patent is extended or adjusted under 35 U.S.C. 154(b) by 609 days.

(21) Appl. No.: 17/919,749

(22) PCT Filed: Apr. 21, 2021

(86) PCT No.: PCT/EP2021/060295
§ 371 (c)(1),
(2) Date: Oct. 19, 2022

(87) PCT Pub. No.: WO2021/214093
PCT Pub. Date: Oct. 28, 2021

(65) Prior Publication Data
US 2023/0151272 A1 May 18, 2023

(30) Foreign Application Priority Data
Apr. 22, 2020 (DE) .................. 10 2020 205 104.6

(51) Int. Cl.
*C09K 11/68* (2006.01)
*C01G 19/00* (2006.01)
(Continued)

(52) U.S. Cl.
CPC .......... *C09K 11/681* (2013.01); *C01G 19/006* (2013.01); *C01G 41/006* (2013.01);
(Continued)

(58) Field of Classification Search
CPC ... C09K 11/681; C09K 11/684; C09K 11/678; C09K 11/665; C09K 11/616
See application file for complete search history.

(56) References Cited

U.S. PATENT DOCUMENTS

2004/0219116 A1   11/2004  Reynders et al.
2020/0135983 A1   4/2020   Ichikawa et al.
(Continued)

FOREIGN PATENT DOCUMENTS

CN    106753359 A   5/2017
CN    107779191 A   3/2018
(Continued)

OTHER PUBLICATIONS

Hu, Tao et al.: "A highly-distorted octahedron with a C2v group symmetry inducing an ultraintense zero phonon line in Mn4+-activated oxyfluoride Na2WO2F4", Jorunal of Materials Chemistry C, 2017, pp. 10524-10532, The Royal Society of Chemistry, vol. 5.
(Continued)

*Primary Examiner* — Matthew E. Hoban
(74) *Attorney, Agent, or Firm* — Viering, Jentschura & Partner mbB (57) ABSTRACT

A luminophore may have the general formula $A_2EZ_zX_x$:RE, where:
  A is selected from the group of the monovalent elements;
  E is selected from the group of the tetravalent, pentavalent, or hexavalent elements;
  Z is selected from the group of the divalent elements;
  X is selected from the group of the monovalent elements;
  RE is selected from activator elements;
(Continued)

$2+e=2z+x$, with the charge number e of the element E; and $x+z=5$ and $z>0$.

A process is also disclosed that is directed to producing the luminophore and a corresponding radiation-emitting component.

20 Claims, 5 Drawing Sheets

(51) Int. Cl.
    *C01G 41/00*     (2006.01)
    *C09K 11/66*     (2006.01)
    *H10H 20/851*     (2025.01)

(52) U.S. Cl.
    CPC ....... *C09K 11/665* (2013.01); *H10H 20/8513* (2025.01); *C01P 2002/54* (2013.01); *C01P 2002/72* (2013.01); *C01P 2002/76* (2013.01); *C01P 2002/77* (2013.01)

(56) References Cited

U.S. PATENT DOCUMENTS

| | | | |
|---|---|---|---|
| 2021/0246369 A1 | 8/2021 | Seibald et al. | |
| 2022/0220375 A1 | 7/2022 | Seibald et al. | |

FOREIGN PATENT DOCUMENTS

| | | |
|---|---|---|
| CN | 110511755 A | 11/2019 |
| DE | 102019207046 A1 | 11/2020 |
| JP | 2004339475 A | 12/2004 |
| JP | 2015147836 A | 8/2015 |
| WO | 2013175336 A1 | 11/2013 |
| WO | 2018230569 A1 | 12/2018 |

OTHER PUBLICATIONS

Stoll, Christiane et al., Abstract of "K2SnOF4 and K2WO3F2—different but similar", Zeitschrift fuer Naturforschung B, Sep. 16, 2020, 9 pages, De Gruyter.

Adachi, Sadao, "Crystal-field and Racah parameters of Mn4+ ion in red and deep red-emitting phosphors: Fluoride versus oxide phosphor", Journal of Luminescence, Feb. 2020, 9 pages, Elsevier, vol. 218.

Torardi, C. C. et al., "Structure and luminescence of Ba2WO3F4", Materials Research Bulletin, Feb. 1985, pp. 137-145, vol. 20, Issue 2.

International Search Report issued for the corresponding International patent application No. PCT/EP2021/060295, dated Jul. 8, 2021, 6 pages (for informational purposes only).

Hu, Tao et al., "Host sensitization of Mn4+ in self-activated Na2WO2F4:Mn4+", Journal of the American Ceramic Society, 2018, pp. 3437-3442.

Kloditz, L. et al., "Über flourhaltige Komplexe, IX—Kondensierte Fluorooxokomlexe des Zinns und Germaniums", Zeitschrift für anorganische und allgemeine Chemie, vol. 325, 1963, 24 pages.

Mattes, R. et al., "Darstellung, Struktur und Schwingungsspektren der Oxofluorowolframate(VI) Cs2[WO3F2] und Cs3[W2O4F7]", Zeitschrift für anorganische und allgemeine Chemie, vol. 494, 1982, 12 pages.

Japanese Office Action for the corresponding Japanese patent application No. 2022564267, dated Nov. 29, 2023, pages (for informational purposes only).

Japanese Search Report for the corresponding Japanese patent application No. 2022564267, dated Oct. 2, 2023, 10 pages (for informational purposes only).

Casey J. Gahrs et al., "Investigation of Ce3+-doped Na3Mo1-xWxO4F and Na2Mo1-xWxO4 as Novel Phosphor Materials", ECS Transactions, The Electrochemical Society, vol. 66, No. 43, pp. 43-54.

Christiane Stoll et al.: "K3WOF7:Mn4+—A red oxyflouride phosphor", Journal of Flouride Chemistry, 2019, vol. 226, No. 109356, 7 pages.

German office action issued for the corresponding German patent application No. 112021002460.4, dated Jun. 29, 2024, 5 pages (for informational purposes only).

Pust, Philipp et al. "Narrow-band red-emitting Sr[LiAl3N4]: Eu2+ as a next-generation LED-phosphor material", Nature Materials, Jun. 22, 2014, pp. 891-896, vol. 13, Macmillan Publishers Limited.

Schmiechen, Sebastian et al., "Toward New Phosphors for Application in Illumination-Grade White pc-LEDs: The Nitridomagnesosilicates Ca[Mg3SiN4]:Ce3+, Sr[Mg3SiN4]: Eu2+, and Eu[Mg3SiN4]", ACS Publications, Mar. 27, pp. 2712-2719, 2014, vol. 26, retrieved on Jan. 23, 2023.

LUMINOPHORE, METHOD FOR PRODUCING A LUMINOPHORE AND RADIATION-EMITTING COMPONENT

CROSS-REFERENCE TO RELATED APPLICATIONS

The present application is a national stage entry according to 35 U.S.C. § 371 of PCT application No.: PCT/EP2021/060295 filed on Apr. 21, 2021; which claims priority to German patent application DE 10 2020 205 104.6, filed on Apr. 22, 2020; all of which are incorporated herein by reference in their entirety and for all purposes.

TECHNICAL FIELD

A luminophore and a process for producing a luminophore are specified. Also specified is a radiation-emitting component.

BACKGROUND

One problem addressed is that of specifying a luminophore having elevated efficiency. Further objects are that of providing a process for producing a luminophore having elevated efficiency and a radiation-emitting component having elevated efficiency.

SUMMARY

A luminophore is specified. In at least one embodiment, the luminophore has the general formula $A_2EZ_zX_x$:RE where A is selected from the group of the monovalent elements,
E is selected from the group of the tetravalent, pentavalent or hexavalent elements,
Z is selected from the group of the divalent elements,
X is selected from the group of the monovalent elements,
RE is selected from activator elements,
$2+e=2z+x$, with the charge number e of the element E,
$x+z=5$ and $z>0$.

Here and hereinafter, luminophores are described by empirical formulae. The elements listed in the empirical formulae are in charged form. Here and hereinafter, elements or atoms in relation to the empirical formulae of the luminophores thus mean ions in the form of cations and anions, even if this is not stated explicitly. This is also applicable to element symbols if they are stated without charge number for reasons of clarity.

It is possible in the empirical formulae specified that the luminophore includes further elements, for example in the form of impurities. Collectively, these impurities include not more than 5 mol %, especially not more than 1 mol %, especially not more than 100 ppm (parts per million), such as not more than 10 ppm. In the empirical formulae described here, the luminophore includes only monovalent and divalent anions. However, it is not impossible that further, especially anionic, elements are present in the form of impurities.

The present luminophore may be outwardly uncharged. This means that there may be outwardly complete balancing of charge between positive and negative charges within the luminophore. By contrast, it is also possible that the luminophore in a formal sense does not have complete balancing of charge to a small degree.

The charge balance of the present luminophore is found from $2+e=2z+x$ with the charge number e of the element E, $x+z=5$ and z greater than zero ($z>0$). In other words, z is not less than 1 ($z\geq 1$). In particular, x is likewise greater than zero ($x>0$) or not less than 1 ($x\geq 1$).

In the present context, what is meant by the term "valency" in relation to a particular element is how many elements having opposite charge are required in a chemical compound to achieve balancing of charge. Thus, the term "valency" encompasses the charge number of the element.

Monovalent elements are elements having a valency of one. Monovalent elements are frequently singly positively charged in chemical compounds and have a charge number of +1, or are singly negatively charged and have a charge number of −1. Positively charged monovalent elements in the present context are generally selected from the group formed by the alkali metals, the elements of the first transition group, and thallium. Negatively charged monovalent elements in the present context are generally selected from the group formed by the halogens.

Divalent elements are elements having a valency of two. Divalent elements are frequently doubly negatively charged in chemical compounds and have a charge number of −2. Divalent elements in the present context are generally selected from the group formed by the chalcogens.

Tetravalent elements are elements having a valency of four. Tetravalent elements are frequently quadruply positively charged in chemical compounds and have a charge number of +4. Tetravalent elements in the present context are generally selected from the group formed by tin, silicon, germanium, zirconium, hafnium, lead and titanium.

Pentavalent elements are elements having a valency of five. Pentavalent elements are frequently quintuply positively charged in chemical compounds and have a charge number of +5. A pentavalent element in the present context is generally vanadium.

Hexavalent elements are elements having a valency of six. Hexavalent elements are frequently sextuply positively charged in chemical compounds and have a charge number of +6. Hexavalent elements in the present context are generally selected from the group formed by tungsten and molybdenum.

A luminophore described here is able to convert electromagnetic radiation of a first wavelength or first wavelength range, referred to hereinafter as primary radiation, to electromagnetic radiation of a second wavelength or second wavelength range, referred to hereinafter as secondary radiation. The conversion of primary radiation to secondary radiation is also referred to as wavelength conversion. In particular, in wavelength conversion, primary radiation is absorbed by a wavelength-converting element containing a luminophore, transformed to secondary radiation through electronic processes at the atomic and/or molecular level, and emitted again. Primary radiation and secondary radiation have at least partly different wavelength ranges, with the secondary radiation, in one embodiment, having a longer-wave wavelength range.

A luminophore described here, after excitation, is able to emit red, especially deep red, light and hence—according to the application—can be used for generation of red or white light, for example in white LED sources with a particularly high color rendering index, especially in combination with a high R9 value, in general lighting or in background lighting devices such as displays that are suitable for rendering of large color spaces.

In conversion-based white LEDs, the shape and position of the emission bands in the red spectral region play a crucial role for a high color rendering index (CRI). An important factor for a high efficiency is a high integral overlap of the emission bands with the eye sensitivity curve. The luminophore described here advantageously has emission maxima in wavelength regions in which the overlap with the eye sensitivity curve is particularly large, as a result of which it is possible to achieve a high spectral efficiency. At the same time, the luminophore described here has a low spectral breadth of emission, which makes it possible to keep the number of photons low in regions of low eye sensitivity and at the same time to obtain many photons in the desired red region.

In one embodiment, the luminophore comprises a crystalline host material into which extraneous elements have been introduced as activator elements. The luminophore is, for example, a ceramic material.

The activator element of the luminophore is able to directly absorb the primary radiation, which induces an electronic transition. Alternatively, the host material can absorb the primary radiation and transfer the energy absorbed to the activator element, which causes an electronic transition in the activator element. In both cases, the excited electrons of the activator element can return to the ground state with emission of secondary radiation. The activator element introduced into the host structure is thus responsible for the wavelength-converting properties of the luminophore.

The crystalline host structure is especially formed from a generally periodically repeating three-dimensional unit cell. In other words, the unit cell is the smallest repeating unit in the crystalline host structure. The elements A, E, Z and X each occupy fixed sites therein, called point positions, in the three-dimensional unit cell of the host structure.

Description of the three-dimensional unit cell of the crystalline host structure requires six lattice parameters: three lengths a, b and c, and three angles $\alpha$, $\beta$ and $\gamma$. The three lattice parameters a, b and c are the lengths of the lattice vectors that form the unit cell. The three further lattice parameters $\alpha$, $\beta$ and $\gamma$ are the angles between these lattice vectors. $\alpha$ is the angle between b and c, $\beta$ is the angle between a and c, and $\gamma$ is the angle between a and b. V here corresponds to the volume and $\rho$ to the packing density of the unit cell.

In at least one embodiment, the lattice parameter a is in the range from 590 pm to 630 pm inclusive, the lattice parameter b in the range from 720 pm to 750 pm inclusive, and the lattice parameter c in the range from 1060 pm to 1100 pm inclusive. In at least one embodiment, the angles $\alpha$, $\beta$ and $\gamma$ are in the range from 89° to 91° inclusive, such as 90°.

In at least one embodiment, the volume V of the unit cell of the host structure is in the range from 0.45 nm$^3$ to 0.52 nm$^3$ inclusive.

In at least one embodiment, the packing density p of the unit cell of the host structure is in the range from 3 gcm$^{-3}$ to 6 gcm$^{-3}$ inclusive. The exact values of the lattice parameters, the volume and the packing density are dependent on the individual elements of the general formula.

In at least one embodiment, the luminophore comprises various phases or consists of various phases. The phases comprise the general formula $A_2EZ_zX_x$:RE or consist of the general formula $A_2EZ_zX_x$:RE. Further constituents of the phases may, for example, be reactants that have not reacted in the preparation of the luminophore, impurities and/or secondary phases that have been formed in the reaction.

In at least one embodiment, the luminophore has the formula $A_2EO_zF_x$:RE. Thus, the luminophore has oxygen and fluorine as anions. These elements are readily available.

In at least one embodiment, A is selected from Li, Na, K, Rb, Cs and combinations thereof. In at least one embodiment, A comprises or consists of K. These elements are readily available.

In at least one embodiment, E is selected from Sn, Si, Ge, Ti, Zr, Hf, Pb, V, W, Mo, and combinations thereof. In at least one embodiment, E comprises or consists of Sn. In at least one embodiment, E comprises or consists of W. These elements are readily available.

In at least one embodiment, RE is selected from Mn, Cr, Ni, the group of lanthanoids, especially Ce, Eu, Yb, Tb, Sm, Pr, Er, and combinations thereof. In at least one embodiment, RE is selected from Mn, Eu, Ce and combinations thereof. In at least one embodiment, RE comprises or consists of Mn. In particular, Mn is in the form of Mn$^{4+}$.

In at least one embodiment, RE has a molar proportion between 0.001 and 0.1 inclusive, based on the element E. In other words, between 0.1% and 10% inclusive of the E atoms are replaced by RE. In particular, the molar proportion of RE based on E is between 0.02 and 0.06 inclusive, for example 0.042.

In at least one embodiment, the luminophore has the formula $K_2SnOF_4$:RE. In one embodiment, RE here is Mn$^{4+}$. Thus, the luminophore may be an Mn$^{4+}$-doped potassium oxidofluorido-stannate. The emission in the red wavelength region by the luminophore of the formula $K_2SnOF_4$:RE shows high overlap with the eye sensitivity curve, which increases luminous efficacy of radiation (LER) by up to 6% compared to the comparative example $K_2SiF_6$:Mn$^{4+}$. In addition, the luminophore of the formula $K_2SnOF_4$:RE may be produced without using hydrofluoric acid.

In at least one embodiment, the luminophore has the formula $K_2WO_3F_2$:RE. In one embodiment, RE here is Mn$^{4+}$. Thus, the luminophore may be an Mn$^{4+}$-doped potassium oxidofluorido-tungstate. A luminophore of the formula $K_2WO_3F_2$:RE may be produced without using hydrofluoric acid.

In at least one embodiment, the luminophore has a host structure that crystallizes in an orthorhombic space group. In at least one embodiment, the host structure of the luminophore crystallizes in the orthorhombic space group Pnma (no. 62).

In at least one embodiment, the luminophore has a host structure comprising $[E(Z, X)_6]^{4-}$ octahedra linked via common Z atoms to give strands. Here and hereinafter, the term "octahedron" is used to describe the linkage patterns and coordination sphere of the individual atoms within the crystal structure. The term "octahedron" here and hereinafter, however, should not be regarded exclusively in the strictly mathematical sense. In particular, slight distortions can occur, such that the bond distances and angles can differ from those of a perfect octahedron in the mathematical sense. In particular, it is also possible for individual atom positions to have a shift or deflection compared to the positions in a perfect octahedral coordination.

The $[E(Z, X)_6]^{4-}$ octahedra are formed by the Z atoms and the X atoms. In particular, in the $[E(Z, X)_6]^{4-}$ octahedra, at least two opposite vertices are occupied by Z atoms.

The E atom is disposed within the octahedron. In other words, the octahedra are arranged around the E atom. The E atom is surrounded by a total of six X atoms and Z atoms in the form of an octahedron. In particular, all atoms that form the octahedron have a similar distance from the E atom within the octahedron.

The strands may be formed from a multitude of linked $[E(Z, X)_6]^{4-}$ octahedra. The Z atom that links the $[E(Z, X)_6]^{4-}$ octahedra to form strands is a common Z atom of the linked octahedra. Such a Z atom is also referred to as a doubly bridging Z atom. In other words, the strands consist of mutually bonded $[EZ_{2/2}(Z, X)_4]^{2-}$ octahedra. In particular, the $[E(Z, X)_6]^{4-}$ octahedra are linked via Z atoms disposed at opposite vertices of the octahedron. In particular, each $[E(Z, X)_6]^{4-}$ octahedron is linked by exactly two further $[E(Z, X)_6]^{4-}$ octahedra. In a non-limiting embodiment, the host structure of the luminophore comprises multiple strands of linked $[E(Z, X)_6]^{4-}$ octahedra. In particular, the individual strands are not linked directly, in particular not even indirectly, to one another.

In at least one embodiment, the strands composed of linked $[E(Z, X)_6]^{4-}$ octahedra form interspaces, with an A element present at least in one interspace. In particular, the strands composed of linked $[E(Z, X)_6]^{4-}$ octahedra are arranged parallel to one another and run along the vertical edges of the unit cell parallel to the crystallographic b axis or along [010] and vertically through the middle of the unit cell along [010]. The interspaces especially take the form of cavities or channels between the strands of linked $[E(Z, X)_6]^{4-}$ octahedra. In particular, the A atoms in the interspaces serve as counterions for the balancing of charge of the $[E(Z, X)_6]^{4-}$ octahedra.

In at least one embodiment, an emission spectrum of the luminophore has a multitude of emission peaks between 570 nm and 700 nm, especially between 590 nm and 660 nm. An emission spectrum is the distribution of the electromagnetic radiation emitted by the luminophore. Typically, the emission spectrum of a luminophore is represented in the form of a diagram in which a spectral intensity of the electromagnetic radiation emitted by the luminophore is represented as a function of the wavelength $\lambda$. In other words, the emission spectrum constitutes a curve in which the wavelength is plotted on the x axis and spectral intensity on the y axis.

The luminophore can thus convert primary radiation, especially primary radiation in the visible blue wavelength range, for example from 430 nm to 500 nm inclusive, to secondary radiation in the red wavelength range. A multitude of emission peaks is at least two emission peaks having different spectral positions in the emission spectrum. The emission peaks may have an identical or different spectral intensity. In particular, the emission spectrum of the luminophore takes the form of a line spectrum.

In at least one embodiment of the luminophore, a half-height width of an emission peak is between 1 nanometer and 15 nanometers inclusive.

In particular, a half-height width of an emission peak is between 1 nanometer and 10 nanometers inclusive, such as between 1 nanometer and 5 nanometers inclusive. In particular, the half-height width of each emission peak is between 1 nanometer and 15 nanometers inclusive. The narrowband-emitting luminophore thus produces comparatively few photons in the deep red spectral region that are perceived only very inefficiently by the human eye, while the red color impression of the light and the light yield are simultaneously increased.

In at least one embodiment, an emission maximum of an emission peak of the luminophore is between 626 nm and 635 nm inclusive, especially between 629 nm and 632 nm inclusive. The emission maximum is the wavelength $\lambda_{max}$ at which the emission curve of the luminophore reaches its maximum value. In particular, the emission maximum of the luminophore after excitation with primary radiation in the blue spectral region, for example from 430 nm to 500 nm inclusive, is between 626 nm and 635 nm inclusive, especially between 629 nm and 632 nm inclusive. Thus, the emission maximum of the luminophore after excitation with primary radiation in the blue spectral region is in the red spectral region. For example, the emission maximum of the luminophore $K_2SnOF_4:Mn^{4+}$ is about 630.5 nm and thus within a preferred range for red luminophores.

It is advantageous here that the emission spectrum, especially by comparison with the comparative example of the red-emitting luminophore $K_2SiF_6:Mn^{4+}$, is shifted to shorter wavelengths and has at least one additional emission peak. The sensitivity of the human eye to light is relatively low in the red spectral region and rises nearly exponentially with decreasing wavelengths. The effect of this is that the spectral position of the emission of the luminophore has an extremely strong influence on the overall spectral efficiency of a radiation-emitting component. For instance, in this spectral region, even small shifts in otherwise identical emission bands and additional emission bands lead to changes in efficiency of the luminophore in the percent range.

Also specified is a process for producing a luminophore. In particular, all the remarks made in respect of the luminophore are also applicable to the process, and vice versa.

In at least one embodiment of the process for producing a luminophore (1) having the general formula $A_2EZ_zX_x$:RE where
  A is selected from the group of the monovalent elements,
  E is selected from the group of the tetravalent, pentavalent or hexavalent elements,
  Z is selected from the group of the divalent elements,
  X is selected from the group of the monovalent elements,
  RE is selected from activator elements,
  2+e=2z+x, with the charge number e of the element E,
  x+z=5 and z>0,
the process comprises the steps of
  synthesizing the host material, and
  doping the host material.

In at least one embodiment, the synthesis of the host material comprises the steps of:
  providing a composition of reactants,
  heating the composition of reactants to a maximum temperature between 150° C. and 1000° C. inclusive, at a maximum pressure between 0.55 GPa and 7.50 GPa inclusive.

In particular, a change in temperature, for example heating or cooling, and/or a change in pressure, for example an increase in pressure or a decrease in pressure, can take place via a gradient, for example via uniform heating or a uniform increase in pressure over a particular period of time. In particular, the gradient can be varied during the change in temperature and/or the change in pressure. A change in the gradient may be stepwise or uniform.

In at least one embodiment, the reactants for the synthesis of the host material are selected from a group comprising halides, hydrogenhalides and chalcogenides of A and E, where the composition of reactants includes at least one chalcogenide and at least one halide or a hydrogenhalide. In particular, the reactants are selected from a group comprising fluorides, hydrogenfluorides and oxides of A and E.

In at least one embodiment, at least one reactant is present in excess in the composition of reactants. This means that the molar ratio of the reactants to one another is not stoichiometric. At least one reactant is present in the composition of reactants in a greater molar ratio relative to at least one further reactant than would be stoichiometrically necessary.

In at least one embodiment, the synthesis of the host material is conducted in a high-pressure press, for example a multianvil high-pressure press.

In at least one embodiment, the composition of reactants is heated to a maximum temperature between 250° C. and 450° C. inclusive, for example 350° C. Alternatively or additionally, the composition of reactants can be heated at a maximum pressure between 1.50 GPa and 3.50 GPa inclusive, for example of 2.50 GPa.

In at least one embodiment, the composition of reactants is heated to a maximum temperature between 800° C. and 1000° C. inclusive, for example of 900° C. Alternatively or additionally, the composition of reactants can be heated at a maximum pressure between 4.50 GPa and 6.50 GPa inclusive, for example of 5.50 GPa.

In at least one embodiment, the doping of the host material comprises the steps of:
providing a composition of host material and dopant,
grinding the composition of host material and dopant.

In particular, the dopant is in the form of a salt, for example of an alkali metal-activator element halide.

In at least one embodiment, the doping of the host material is conducted in a ball mill at 100 rpm to 500 rpm inclusive, for example 300 rpm.

In at least one embodiment, the step of grinding the composition of host material and dopant is repeated several times, especially at least twice and at most ten times, for example six times.

In at least one embodiment, no hydrofluoric acid solution is used. The risk potential emanating from addition of a hydrofluoric acid solution is accordingly avoided.

The red-emitting comparative luminophore $K_2SiF_6$:Mn, by contrast, is synthesized industrially with the aid of an aqueous hydrofluoric acid solution. On account of the toxicity and difficulty of handling hydrofluoric acid, this entails working under very complex safety precautions. In the case of the luminophore described here, synthesis by a dry high-temperature and high-pressure method is simplified compared to the process with hydrofluoric acid and is less hazardous.

Additionally specified is a radiation-emitting component comprising a luminophore. The above-described luminophore may be suitable and intended for use in a radiation-emitting component described here. Features and embodiments described in conjunction with the luminophore and/or the process are also applicable to the radiation-emitting component and vice versa.

The radiation-emitting component is a component which, in operation, emits electromagnetic radiation, especially visible light. For example, the radiation-emitting component is a light-emitting diode (LED), or the radiation-emitting component comprises a light-emitting diode.

In at least one embodiment, the radiation-emitting component comprises
a semiconductor chip which, in operation, emits electromagnetic radiation from a first wavelength range,
a conversion element including a luminophore having the general formula $A_2EZ_zX_x$:RE that converts electromagnetic radiation of the first wavelength range to electromagnetic radiation of a second wavelength range, wherein
A is selected from the group of the monovalent elements,
E is selected from the group of the tetravalent, pentavalent or hexavalent elements,
Z is selected from the group of the divalent elements,
X is selected from the group of the monovalent elements,
RE is selected from activator elements,
$2+e=2z+x$, with the charge number e of the element E,
$x+z=5$ and $z>0$.

The semiconductor chip may comprise an active layer sequence containing an active region which, in operation of the component, can generate the electromagnetic radiation in the first wavelength range, the primary radiation. The semiconductor chip is, for example, a light-emitting diode chip or a laser diode chip. The primary radiation which is generated in the semiconductor chip may be emitted through a radiation exit surface of the semiconductor chip and form a beam path.

In particular, the semiconductor chip, in operation, emits electronic radiation from the visible spectral region. For example, the semiconductor chip emits primary radiation in the blue spectral region, especially in the wavelength range from 430 nm to 550 nm inclusive, for example from 430 nm to 500 nm inclusive, for example at 448 nm. Alternatively, the semiconductor chip, in operation, emits electromagnetic radiation from the ultraviolet spectral region, for example with wavelengths from 330 nm to 430 nm inclusive.

The conversion element is especially disposed in the beam path of the primary radiation such that at least some of the primary radiation hits the conversion element. For this purpose, the conversion element may be applied in direct contact atop the semiconductor chip, especially the radiation exit surface, or be arranged spaced apart from the semiconductor chip.

The luminophore in the conversion element converts the primary radiation fully or at least partly to electromagnetic radiation in a second wavelength range, the secondary radiation. In particular, the secondary radiation has a wavelength range at least partly different than the primary radiation.

The properties of the luminophore have already been disclosed in relation to the luminophore and are likewise applicable to the luminophore in the radiation-emitting component.

Such a radiation-emitting component can especially generate radiation in the red wavelength range with a high spectral efficiency or, especially in the case of combination with green, yellow and/or orange light, be used to generate white light with a particularly high color rendering index. In particular, it is possible to generate white light with a high red color rendering index R9 for saturated red light. The radiation-emitting component may thus be used for generation of warm white or red light, for example in general lighting or in display applications.

In at least one embodiment, the luminophore emits in the red, especially deep red, spectral region. In particular, the luminophore, after excitation with blue primary radiation, emits in the red, especially deep red, spectral region.

In at least one embodiment, the conversion element comprises at least one further luminophore that converts electromagnetic radiation in the first wavelength range to electromagnetic radiation in a third wavelength range. The third wavelength range is especially at least partly different than the primary radiation and/or the secondary radiation.

By use of at least one further luminophore in combination with a luminophore of the general formula $A_2EZ_zX_x$:RE, it is possible to adjust the color locus of the radiation-emitting component. The overall emission of the radiation-emitting component is then composed of the primary radiation from the semiconductor chip, the secondary radiation, and the radiation in the third wavelength range. The at least one further luminophore may convert the primary radiation from the semiconductor chip. This can achieve a higher efficiency of the radiation-emitting component.

In at least one embodiment, the conversion element comprises a further luminophore that emits in the green spectral region. The green-emitting luminophore used may especially be β-SiAlON. β-SiAlON has narrowband emission. When blue primary radiation and a luminophore of the general formula $A_2EZ_zX_x$:RE are used, it is possible in this way to provide a component that is suitable for rendering of large color spaces in display applications.

In at least one embodiment, the conversion element comprises a further luminophore that emits in the yellow spectral region. Yellow-emitting luminophores used may especially be garnets. When blue primary radiation and a luminophore of the general formula $A_2EZ_zX_x$:RE are used, it is possible to generate mixed light having a color locus in the warm white region.

In at least one embodiment, the conversion element comprises a further luminophore that emits in the orange spectral region. Orange-emitting luminophores used may especially be nitrides. When blue primary radiation and a luminophore of the general formula $A_2EZ_zX_x$:RE are used, it is possible to generate mixed light having a color locus in the warm white region.

In at least one embodiment, the conversion element comprises at least two further different-emitting luminophores. The conversion element, for example, as well as the luminophore of the general formula $A_2EZ_zX_x$:RE, includes a green-emitting and/or a yellow-emitting luminophore and/or an orange-emitting and/or a red-emitting luminophore.

In at least one embodiment, the conversion element is free of any further luminophore. What is meant by "free of any further luminophore" is that only one luminophore having the general formula $A_2EZ_zX_x$:RE is present in the conversion element in the radiation-emitting component for wavelength conversion and leads to wavelength conversion within the radiation-emitting component. The radiation-emitting component then emits red light, for example, in the case of full conversion.

BRIEF DESCRIPTION OF THE DRAWINGS

Further advantageous embodiments, configurations and developments of the luminophore, of the process for producing a luminophore and of the radiation-emitting component will be apparent from the working examples that follow, which are described in conjunction with the figures.

Elements that are the same, of the same type or have the same effect are given the same reference numerals in the figures. The figures and the size ratios of the elements shown in the figures relative to one another should not be considered to be to scale. Instead, individual elements, especially layer thicknesses, may be represented in excessively large size for better representability and/or for better understanding.

DETAILED DESCRIPTION

Figure 1A:
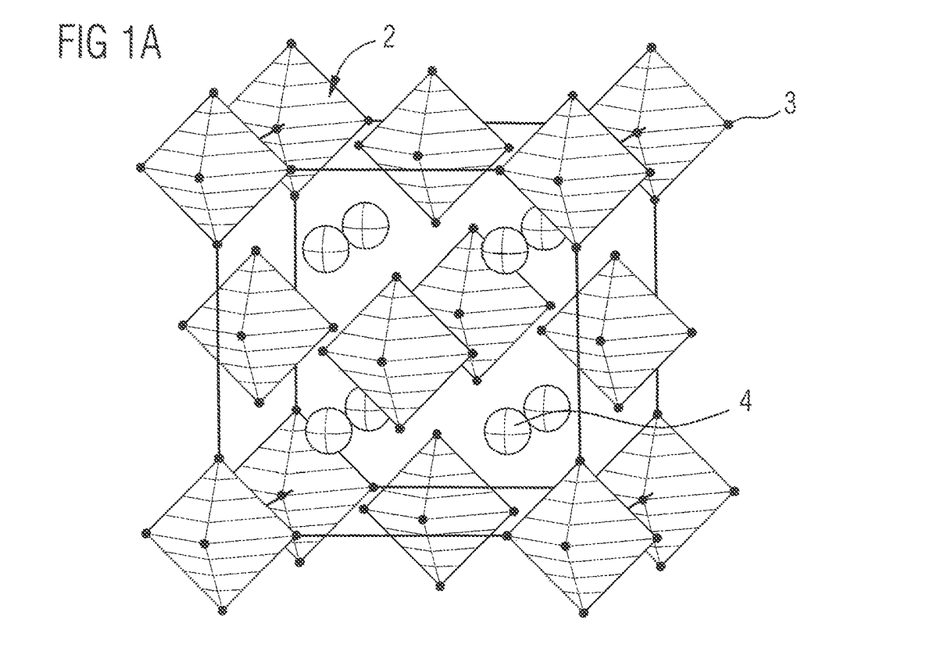
FIG. 1A shows a detail of the host structure of the comparative example $K_2SiF_6$, FIGS. 1B and 1C each show a detail of the host structure of the luminophore in different working examples.

FIG. 1A shows a detail of the host structure of the comparative example $K_2SiF_6$. The host structure of the comparative example $K_2SiF_6$ crystallizes in the cubic Fm-3m space group (no. 225). In the unit cell of the crystal structure of the comparative example $K_2SiF_6$, $[SiF_6]^{2-}$ octahedra 2 are present exclusively in spatially isolated form.

The working examples of the host structures $K_2SnOF_4$ (FIG. 1B) and $K_2WO_3F_2$ (FIG. 1C), by contrast, crystallize in the orthorhombic space group Pnma (no. 62). In the unit cells of the working examples, there are ordered $[SnO_2F_4]^{4-}$ octahedra 5 and $[WO_4F_2]^{4-}$ octahedra 9 that are linked via common oxygen atoms 6 to give infinite strands 7. In other words, in the crystal structure, there are thus $[SnO_{2/2}F_4]^{2-}$ octahedra 5 and $[WO_{2/2}(O_2F_2)]^{2-}$ octahedra 9 that are linked via oxygen atoms 6 to give strands 7.

Figure 1B:
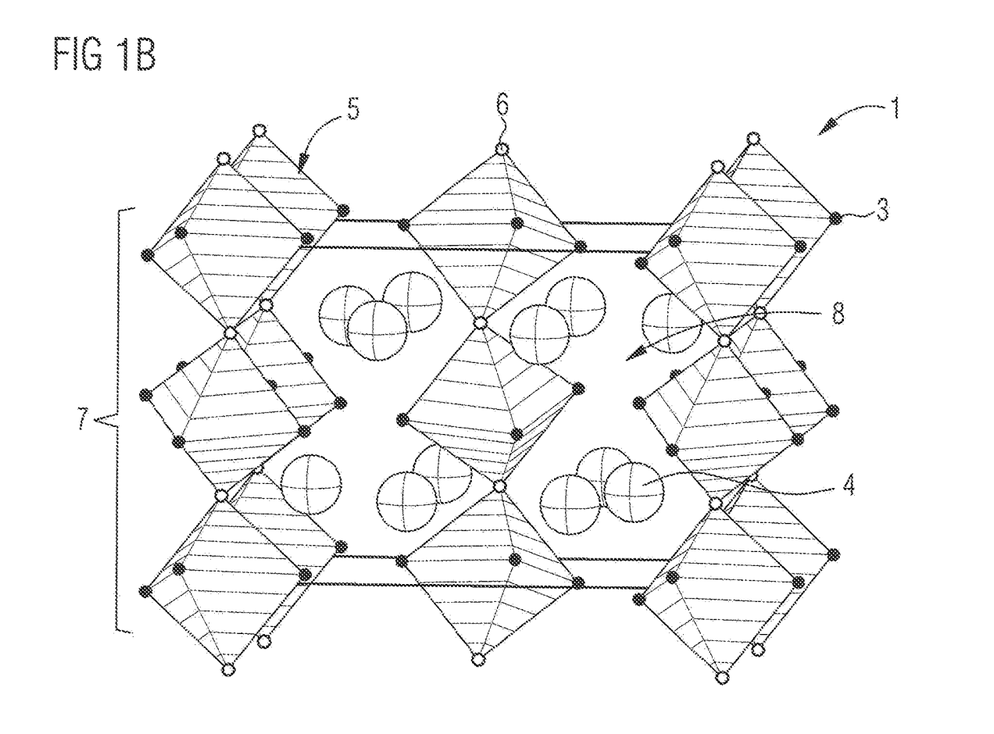

The $[SnO_2F_4]^{4-}$ octahedra 5 in FIG. 1B are formed by two oxygen atoms 6 and four fluorine atoms 3. The two oxygen atoms 6 occupy two opposite vertices of the octahedron via which the octahedra are linked to one another. The four further vertices of the octahedron are occupied by fluorine atoms 3. The Sn atom is arranged within the octahedron.

Figure 1C:
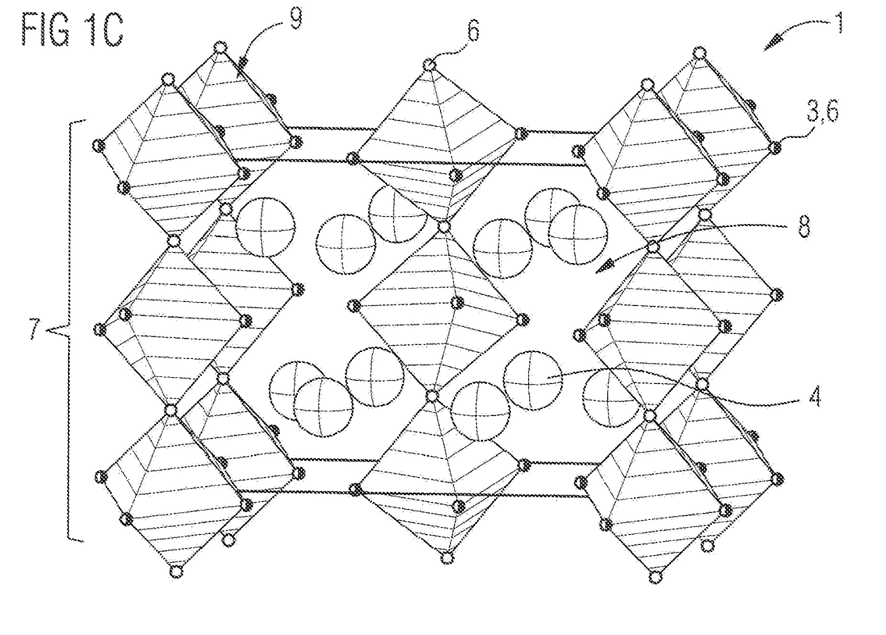

The $[WO_4F_2]^{4-}$ octahedra 9 in FIG. 1C are formed by four oxygen atoms 6 and two fluorine atoms 3. Two oxygen atoms 6 occupy two opposite vertices of the octahedron via which the octahedra are joined to one another. The four further vertices of the octahedron are occupied by a mixture of oxygen atoms and fluorine atoms 3 and 6 (50% each). The W atom is arranged within the octahedron.

The strands 7 are arranged parallel to one another and run along the vertical edges of the unit cell along the crystallographic b axis or along [010], and vertically through the middle of the unit cell along [010]. The strands 7 are not linked to one another either directly or indirectly. Between the strands 7, interspaces 8 are formed, in which potassium atoms 4 are present. The crystal structure, the formation units and the linkage patterns thereof are thus similar to those in $(NH_4)_2FeF_5$.

The working example $K_2SnOF_4$:$Mn^{4+}$ of the luminophore 1 was synthesized as follows: the reactants $SnO_2$ and $KHF_2$ were weighed out in a molar ratio of 1:2.5. The reactant $KHF_2$ was thus in excess.

The reactants were put under a maximum pressure of 2.5 GPa (25 kbar) in a multianvil high-pressure press. The pressure was built up within 65 minutes. Subsequently, the reactants were heated to a maximum temperature of 350° C. with the following temperature program: proceeding from room temperature (RT), the temperature was increased in steps of 32.5° C. per minute to 350° C. Subsequently, the temperature was maintained for 60 minutes. The subsequent cooling of the reaction mixture was effected in steps of 8.125° C. per minute from 350° C. to 25° C. The subsequent reduction of pressure was effected within 200 minutes.

This was followed by doping of the resultant host material $K_2SnOF_4$ in a ball mill. The $K_2SnOF_4$ host material was admixed with the $K_2MnF_6$ dopant in a molar ratio of 1:0.042 and ground 6 times at 300 rpm for 10 minutes. There was a break for 15 minutes between the grinding steps.

The host material of the working example $K_2WO_3F_2$ was synthesized as follows: the KF and $WO_3$ reactants were weighed out in a molar ratio of 2:1. The reactants were thus in a stoichiometric ratio.

The reactants were put under a maximum pressure of 5.5 GPa (55 kbar) in a multianvil high-pressure press. The pressure was built up within 145 minutes. Subsequently, the reactants were heated to a maximum temperature of 900° C.

with the following temperature program: proceeding from room temperature (RT), the temperature was increased to 900° C. in steps of 87.5° C. per minute. Subsequently, the temperature was maintained for 60 minutes. The subsequent cooling of the reaction mixture was effected in steps of 18.33° C. per minute from 900° C. to 350° C. Cooling from 350° C. to room temperature was then effected by switching off the heating power. The subsequent reduction of pressure was effected within 430 minutes.

Tab. 1 below shows the crystallographic data of the host structures of the working examples $K_2SnOF_4$ and $K_2WO_3F_2$ of the luminophore 1. In the orthorhombic space group, the angles α, β and γ are 90°.

Tab. 1 reports the measured section of reciprocal space via the boundaries of the corresponding Miller indices (hkl). As a quality feature reported for the structural refinement, i.e. for the agreement of calculated and measured structure factors F ($F^2$=reflection intensity I) with inclusion of further parameters, the goodness of fit (GoF) is reported, which should be close to 1. In addition, R1/wR2 [I≥2σ(I)] and R1/wR2 [all data] are reported, which should be as close as possible to 0. These are likewise goodness factors for the agreement of F or $F^2$ "measured" with "calculated". For R1/wR2 [I≥2σ(I)], only reflections having an intensity greater than 2× the average error of the determination of intensity itself are considered. For R1/wR2 [all data], all reflections are considered. R1 here is a measure of the general quality in relation to F and tends to 0. wR2 takes account of further parameters and relates to $F^2$.

The goodness factor, and also R1/wR2 [I≥2σ(I)] and R1/wR2 [all data], are within the desired range for both working examples $K_2SnOF_4$ and $K_2WO_3F_2$.

TABLE 1

| Empirical formula | $K_2SnOF_4$ | $K_2WO_3F_2$ |
|---|---|---|
| Crystal system | orthorhombic | orthorhombic |
| Space group | Pnma (no. 62) | Pnma (no. 62) |
| a/pm | 612.35(2) | 607.71(3) |
| b/pm | 738.35(3) | 735.19(3) |
| c/pm | 1082.94(5) | 1077.38(5) |
| Cell volume V/nm$^3$ | 0.4896(1) | 0.4814(1) |
| Z | 4 | 4 |
| Packing density ρ/g × cm$^{-3}$ | 3.919 | 4.803 |
| T/K | 173(2) | 183(2) |
| Diffractometer | BRUKER D8 Quest | BRUKER D8 Quest |
| Radiation/Å | Mo—Kα (0.71073) | Mo—Kα (0.71073) |
| Measurement range/° | 6.7 < 2θ < 75.7 | 6.7 < 2θ < 70 |
| | −10 < h < 10 | −9 < h < 9 |
| | −11 < k < 11 | −11 < k < 11 |
| | −18 < l < 18 | −17 < l < 17 |
| $R_1$/w$R_2$ [I ≥ 2σ(I)] | 0.0153/0.0377 | 0.0148/0.0335 |
| $R_1$/w$R_2$ [all data] | 0.0205/0.0397 | 0.0179/0.0343 |
| GoF | 1.065 | 1.163 |

Figure 2A:
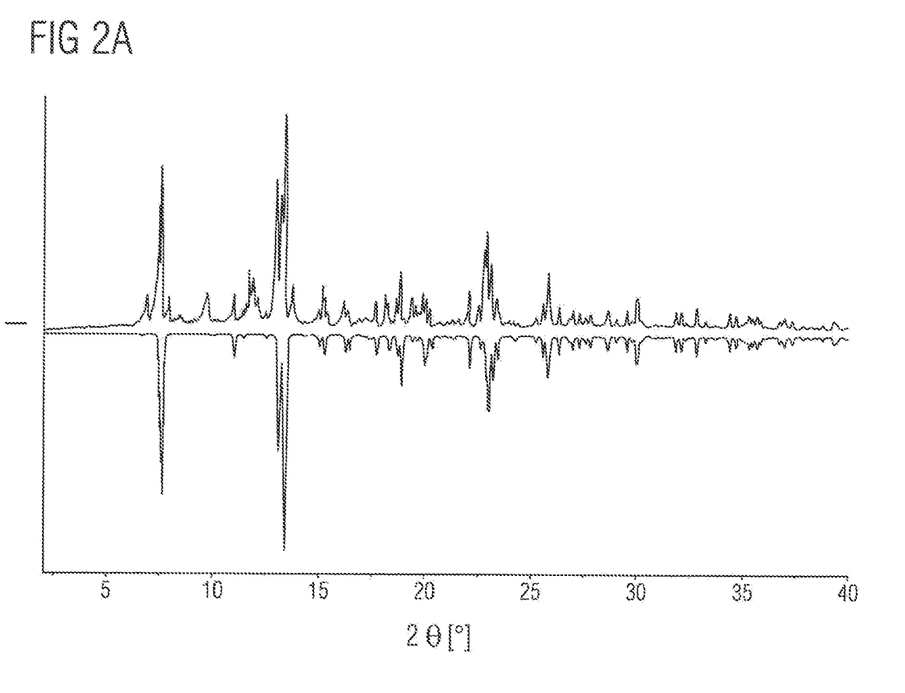
FIGS. 2A and 2B show powder x-ray diffractograms (PXRD) of the host structure of the luminophore and of the luminophore in different working examples.
Figure 2B:
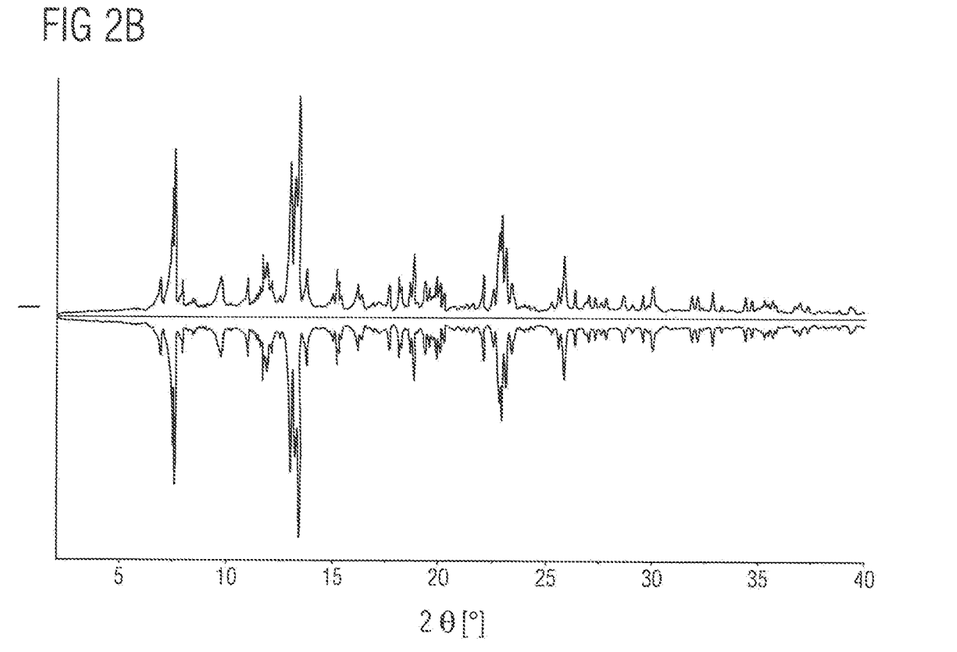

FIG. 2A shows a powder x-ray diffractogram (PXRD) of the undoped host material $K_2SnOF_4$ of the working example $K_2SnOF_4$:$Mn^{4+}$ of the luminophore 1 (top) compared to a simulation based on single-crystal data (bottom). FIG. 2B shows a powder x-ray diffractogram of the working example $K_2SnOF_4$:$Mn^{4+}$ of the luminophore 1 after doping (top) compared to an image before the grinding operation (bottom). The plot in each case is of intensity I against diffraction angle 2θ in degrees. Mo-Kαi radiation was used for the taking of the diffractograms. The powder x-ray diffractograms show that the luminophore 1 can be produced in good quality and is unchanged even after ball milling.

Figure 3:
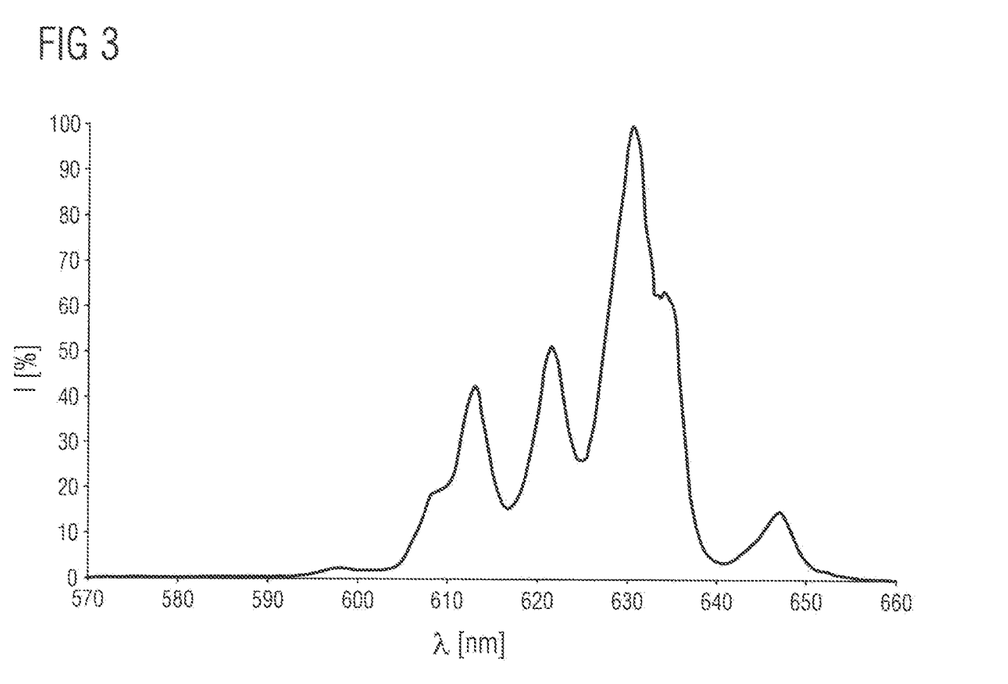
FIG. 3 shows an emission spectrum of the luminophore in one working example.

FIG. 3 shows an emission spectrum of the working example $K_2SnOF_4$:$Mn^{4+}$ of the luminophore 1 after excitation with blue laser light having an excitation wavelength of 448 nm. The plot is of relative intensity I in % against wavelength λ in nm. The emission spectrum shows a line spectrum having a multitude of narrow bands in the wavelength range between 590 nm and 660 nm and hence within the red wavelength range. The emission maximum of the most intense emission band of the luminophore 1 is at about 630.5 nm. Overall, the emission spectrum of FIG. 3 shows at least four emission bands having a relative intensity of more than 25%.

Figure 4A:
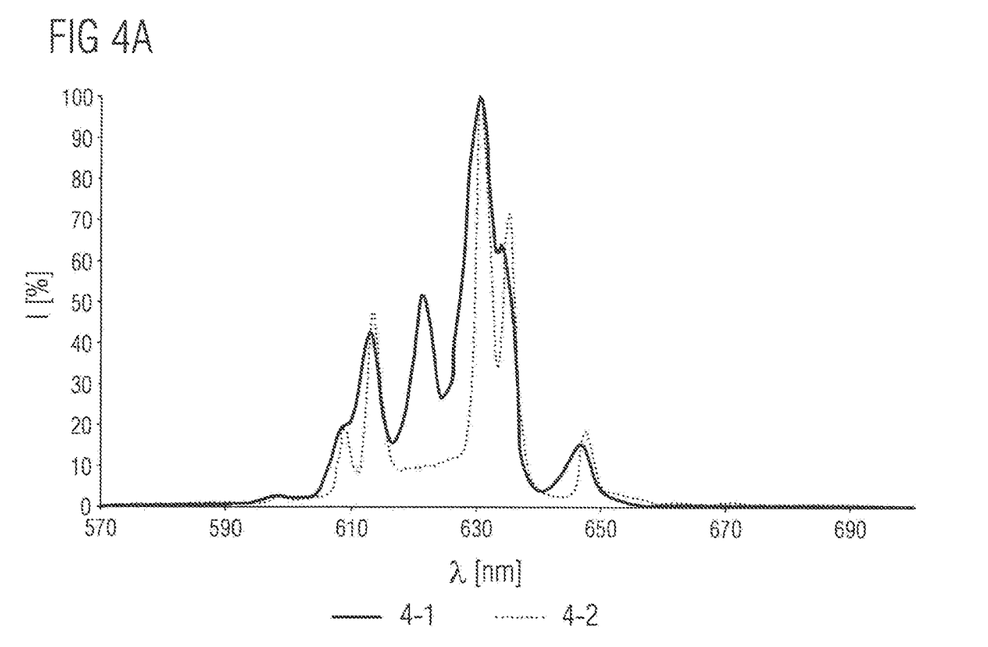
FIG. 4A shows the comparison of emission spectra of a working example and a comparative example.

FIG. 4A shows a comparison of the emission spectra of the working example $K_2SnOF_4$:$Mn^{4+}$ of the luminophore 1 (4-1) with the emission spectrum of the comparative example $K_2SiF_6$:$Mn^{4+}$ (4-2), in each case after excitation with blue laser light having an excitation wavelength of 448 nm. Overall, it is possible to detect a high degree of agreement in terms of number and shape of the individual peaks. However, the emission spectrum of the luminophore 1 (4-1) has a small shift in emission to shorter wavelengths and an additional emission band at about 622 nm. In the cubic comparative luminophore (4-2), the corresponding transition is disallowed on symmetry grounds because of the octahedral Mn environments. As a result of the loss of symmetry with respect to the orthorhombic crystal system of the luminophore 1, the perfect octahedral symmetry is broken, as a result of which the corresponding transition is allowed by symmetry.

Tab. 2 below compares optical properties of the luminophore 1 (4-1) and of the comparative example (4-2).

TABLE 2

| | $λ_{dom}$/nm | $λ_{max}$/nm | x, y coordinates | LER/ lmWopt$^{-1}$ | Rel. LER/% |
|---|---|---|---|---|---|
| 4-1 | 620.5 | 630.5 | 0.693(1); 0.307(1) | 217 | 106 |
| 4-2 | 621 | 631 | 0.693(1); 0.307(1) | 204 | 100 |

Figure 4B:
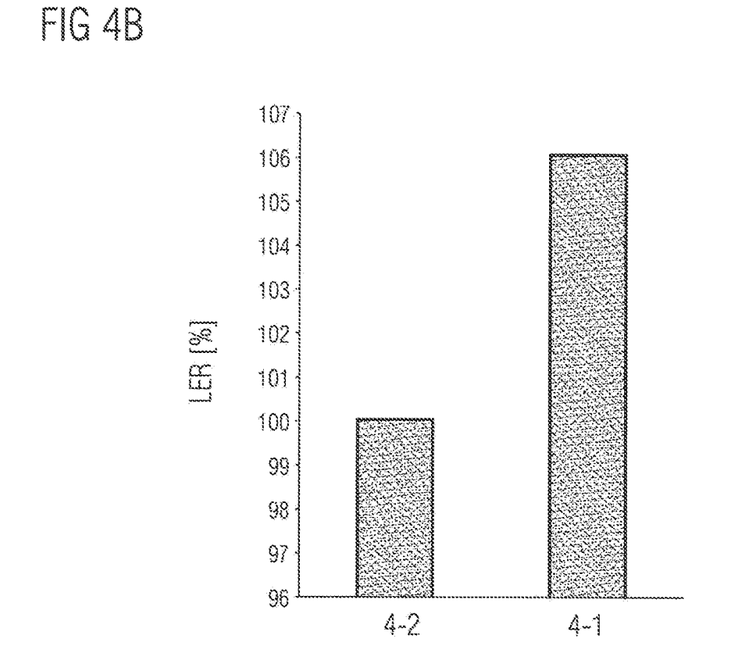
FIG. 4B shows the comparison of spectral efficiency of a working example and a comparative example.

Given a comparable dominant wavelength $λ_{dom}$ and a comparable emission maximum $λ_{max}$ and an identical color locus (x,y coordinates), the luminophore $K_2SnOF_4$:$Mn^{4+}$ has a higher spectral efficiency at 217 lmW$_{opt}^{-1}$ than the comparative example $K_2SiF_6$:$Mn^{4+}$ at 204 lmW$_{opt}^{-1}$. The relative spectral efficiency of the luminophore $K_2SnOF_4$:$Mn^{4+}$ is elevated by 6 percentage points compared to the comparative example $K_2SiF_6$:$Mn^{4+}$ (tab. 2 and FIG. 4B). The rise in efficiency may be the result of the fact that the eye sensitivity curve has a large negative slope in the region of the emission maximum of the luminophore $K_2SnOF_4$:$Mn^{4+}$, as a result of which even small additional signals result in a distinctly different spectral efficiency on the short-wave side of the emission maximum, such as the additional emission band at about 622 nm.

Figure 5:
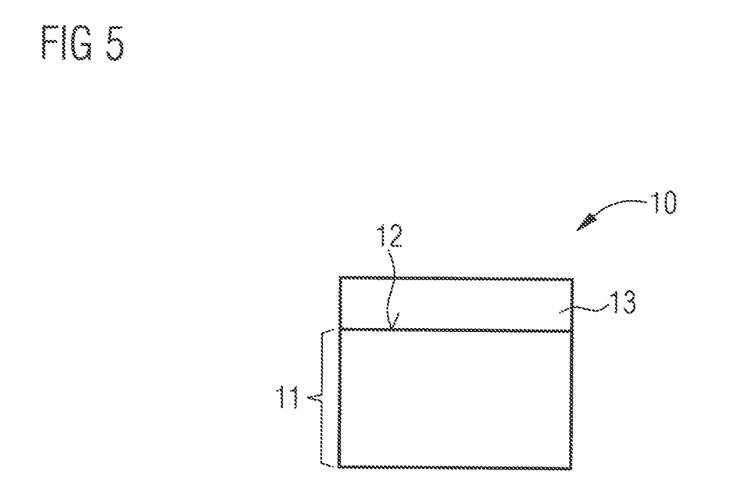
FIG. 5 shows a radiation-emitting component in one working example.

FIG. 5 shows a schematic section diagram of a radiation-emitting component 10. The radiation-emitting component 10 comprises a semiconductor chip 11 with an active layer sequence and an active region (not shown here explicitly), which emits primary radiation in operation of the radiation-emitting component 10. The primary radiation may be electronic radiation in the ultraviolet or blue region. For example, the semiconductor chip 11 is a semiconductor diode chip that emits primary radiation with wavelengths from 430 nm to 500 nm inclusive. Alternatively, the semiconductor chip 11 may be a laser diode chip which, for example, emits primary radiation with a wavelength of 448 nm. The primary radiation is emitted via the radiation exit surface 12 and forms a beam path.

The radiation-emitting component 10 further comprises a conversion element 13 which is set up to absorb the primary radiation and to convert at least partly to secondary radiation. The secondary radiation at least partly has a wavelength range with longer wavelengths than the primary radiation. For example, the conversion element 13 converts the primary radiation to secondary radiation in the red wavelength region.

The conversion element 13 is disposed in the beam path of the primary radiation of the semiconductor chip 11 such that at least some of the primary radiation hits the conversion element. For this purpose, the conversion element 13 may be applied in direct contact atop the semiconductor chip 11, especially the radiation exit surface 12, or be arranged spaced apart from the semiconductor chip 11.

The conversion element 13 includes a luminophore 1 having the general formula $A_2EZ_zX_x$:RE. In particular, the conversion element 13 may include the luminophore 1 having the formula $K_2SnOF_4$:$Mn^{4+}$. The luminophore 1 may be embedded into a matrix material. Alternatively, the conversion element 13 may be free of any matrix material and consist of the luminophore 1, for example of a ceramic of the luminophore 1.

The conversion element 13 may be free of any further luminophore. In that case, the radiation-emitting component 10 generates red light.

Alternatively, the conversion element 13 may include at least one further luminophore that converts the primary radiation or secondary radiation to radiation having an at least partly different wavelength range than the secondary radiation. For example, the conversion element 13 may include a green-emitting further luminophore or a yellow-emitting further luminophore, as a result of which white mixed light can be generated in combination with blue primary radiation. For rendering of large color spaces, the conversion element may especially contain the green luminophore β-SiAlON and the luminophore 1 having the formula $K_2SnOF_4$:$Mn^{4+}$.

Alternatively, the conversion element 13 may include at least two further luminophores selected, for example, from green, yellow, orange or red luminophores, by means of which it is likewise possible to generate white mixed light.

The features and working examples described in conjunction with the figures may be combined with one another in further working examples, even if not all combinations are described explicitly. In addition, the working examples described in conjunction with the figures may alternatively or additionally have further features according to the description in the general part.

The invention is not limited to the working examples by the description with reference thereto. Instead, the invention encompasses any new feature and any combination of features, which especially includes any combination of features in the patent claims, even if this feature or this combination itself is not explicitly specified in the patent claims or working examples.

LIST OF REFERENCE NUMERALS 1 luminophore
2 $[SiF_6]^{2-}$ octahedron
3 F atom
4 K atom
5 $[SnO_2F_4]^{4-}$ octahedron or $[SnO_{2/2}F_4]^{2-}$ octahedron
6 O atom
7 strand
8 interspace
9 $[WO_3F_2]^{4-}$ octahedron or $[WO_{2/2}(O_2F_2)]^{2-}$ octahedron
10 radiation-emitting component
11 semiconductor chip
12 radiation exit surface
13 conversion element

The invention claimed is:

1. A luminophore having a general formula $A_2EZ_zX_x$:RE where:
   A is selected from the group consisting of monovalent elements;
   E is selected from the group consisting of tetravalent, pentavalent, or hexavalent elements;
   Z is selected from the group consisting of divalent elements;
   X is selected from the group consisting of monovalent elements;
   RE comprises an activator element associated with wavelength conversion;
   $2+e=2z+x$, wherein e is a charge number of element E; and
   $x+z=5$ and $z>0$.

2. The luminophore as claimed in claim 1,
   wherein Z is O and X is F so that the luminophore has a formula $A_2EO_zF_x$:RE.

3. The luminophore as claimed in claim 1,
   wherein A is selected from Li, Na, K, Rb, Cs, and combinations thereof;
   wherein E is selected from Sn, Si, Ge, Ti, Zr, Hf, Pb, V, W, Mo, and combinations thereof; and
   wherein RE is selected from Mn, Eu, Ce, and combinations thereof.

4. The luminophore as claimed in claim 1,
   wherein RE has a molar proportion ranging from 0.001 to 0.1 inclusive, based on element E; and
   wherein RE is selected from the group consisting of Mn, Cr, Ni, Ce, Eu, Yb, Tb, Sm, Pr, Er and combinations thereof.

5. The luminophore as claimed in claim 1,
   wherein A is K, E is Sn, Z is O and X is F so that the luminophore has a formula $K_2SnOF_4$:RE, or
   wherein A is K, E is W, Z is O and X is F so that the luminophore has a formula $K_2WO_3F_2$:RE.

6. The luminophore as claimed in claim 1,
   wherein the luminophore has a host structure that crystallizes in an orthorhombic space group.

7. The luminophore as claimed in claim 1,
   wherein the luminophore has a host structure comprising $[E(Z, X)_6]^{4-}$ octahedra linked via common Z atoms to give strands.

8. The luminophore as claimed in claim 7,
   wherein the strands composed of linked $[E(Z, X)_6]^{4-}$ octahedra form interspaces, wherein there is an A element at least in one interspace.

9. The luminophore as claimed in claim 1,
   wherein an emission spectrum of the luminophore has a multitude of emission peaks ranging from 590 nanometers to 700 nanometers.

10. The luminophore as claimed in claim 1,
    wherein a half-height width of an emission peak of the luminophore ranges from 1 nanometer to 15 nanometers inclusive.

11. The luminophore as claimed in claim 1,
    wherein an emission maximum of an emission peak of the luminophore ranges from 626 nanometers to 635 nanometers inclusive.

12. A process for producing a luminophore having a general formula $A_2EZ_zX_x$:RE;

where:
- A is selected from the group consisting of monovalent elements;
- E is selected from the group consisting of tetravalent, pentavalent, or hexavalent elements;
- Z is selected from the group consisting of divalent elements;
- X is selected from the group consisting of monovalent elements;
- RE comprises an activator element associated with wavelength conversion;
- $2+e=2z+x$, wherein e is a charge number of element E; and
- $x+z=5$ and $z>0$;

wherein the method comprises:
- synthesizing a host material comprising a crystalline structure of $A_2EZ_zX_x$; and
- doping the host material with a dopant comprising a salt including RE.

13. The process for producing a luminophore as claimed in claim 12,
wherein the synthesis of the host material comprises:
- providing a composition of reactants; and
- heating the composition of reactants to a maximum temperature ranging from 150° C. to 1000° C. inclusive at a maximum pressure ranging from 0.55 GPa to 7.50 GPa inclusive.

14. The process for producing a luminophore as claimed in claim 12,
wherein the doping of the host material comprises:
- providing a composition of host material and dopant; and
- grinding the composition of host material and dopant.

15. The process for producing a luminophore as claimed claim 12, wherein no hydrofluoric acid solution is used.

16. A radiation-emitting component comprising:
- a semiconductor chip configured to emit electromagnetic radiation from a first wavelength range;
- a conversion element including a luminophore having a general formula $A_2EZ_zX_x$:RE that converts electromagnetic radiation of the first wavelength range to electromagnetic radiation of a second wavelength range;

wherein:
- A is selected from the group consisting of monovalent elements;
- E is selected from the group consisting of tetravalent, pentavalent, or hexavalent elements;
- Z is selected from the group consisting of divalent elements;
- X is selected from the group consisting of monovalent elements;
- RE comprises an activator element associated with wavelength conversion;
- $2+e=2z+x$, wherein e is a charge number of element E; and
- $x+z=5$ and $z>0$.

17. The radiation-emitting component as claimed in claim 16, wherein the luminophore emits in a red spectral region.

18. The radiation-emitting component as claimed in claim 16, wherein the conversion element comprises at least one further luminophore configured to convert electromagnetic radiation of the first wavelength range to electromagnetic radiation of a third wavelength range.

19. The radiation-emitting component as claimed in claim 18, wherein the conversion element comprises a further luminophore configured to emit in a green spectral region.

20. The radiation-emitting component as claimed in claim 16,
wherein the conversion element is free of any further luminophore.

* * * * *